(12) United States Patent
McClelland et al.

(10) Patent No.: US 7,517,039 B2
(45) Date of Patent: Apr. 14, 2009

(54) ENABLING INCREASED PRINT SPEED BY ELIMINATING NOZZLE FIRING SEQUENCING

(75) Inventors: Todd Alan McClelland, Corvallis, OR (US); Gregory Frank Carlson, Corvallis, OR (US); Ronald Gregory Paul, Vancouver, WA (US); Steven Michael Goss, Corvallis, OR (US); Randall Lee Stockberger, Independence, OR (US)

(73) Assignee: Marvell International Technology Ltd. (BM)

( * ) Notice: Subject to any disclaimer, the term of this patent is extended or adjusted under 35 U.S.C. 154(b) by 457 days.

(21) Appl. No.: 11/229,774

(22) Filed: Sep. 19, 2005

(65) Prior Publication Data
US 2007/0064035 A1   Mar. 22, 2007

(51) Int. Cl.
*B41J 29/38*   (2006.01)
(52) U.S. Cl. .................... 347/14; 347/9; 347/15
(58) Field of Classification Search .......... 347/9, 347/12, 13, 14, 40–43
See application file for complete search history.

(56) References Cited

U.S. PATENT DOCUMENTS

| | | | | |
|---|---|---|---|---|
| 6,149,263 | A  * | 11/2000 | Nakano | 347/43 |
| 6,179,407 | B1 | 1/2001 | Bockman | |
| 6,250,739 | B1 | 6/2001 | Serra | |
| 6,310,640 | B1 | 10/2001 | Askeland | |
| 6,837,563 | B2 * | 1/2005 | Sato | 347/15 |
| 6,902,247 | B2 | 6/2005 | Vanhooydonck et al. | |

* cited by examiner

*Primary Examiner*—Thinh H Nguyen (57) ABSTRACT

The velocity of a printhead scanning across a sheet of paper or other print medium is varied on the basis of whether masking patterns for selectively activating nozzle of the printhead include activations in consecutive pixel locations of the masking pattern. The pixel locations are "firing opportunities" as defined by the maximum firing frequency assigned to the nozzles when the printhead is scanned at a particular velocity. The printhead is moved at that velocity when a masking pattern includes activation in consecutive pixel locations. On the other hand, a higher scanning velocity is available when a constraint is enforced to prevent occasions of firings in consecutive pixel locations. In one embodiment, the constraint is not enforced, but masking patterns are analyzed on a pattern-by-pattern basis to detect those patterns which satisfy the constraint, so that the scanning velocity can be increased during the suitable masking patterns.

35 Claims, 5 Drawing Sheets

ENABLING INCREASED PRINT SPEED BY ELIMINATING NOZZLE FIRING SEQUENCING

BACKGROUND ART

There is a wide variety of known printing systems. A printing system may be self-contained or may be one that requires cooperation of two or more units, such as a computer printer that is controlled using drive software installed on a personal computer. Print material, such as ink, may be deposited upon a sheet of paper or other print medium by sequential movements of the depositing structure relative to the sheet. As one well known example, an inkjet printhead may be repeatedly scanned across a sheet of paper to apply ink in a series of swaths, until the composite image is formed.

Figure 1:
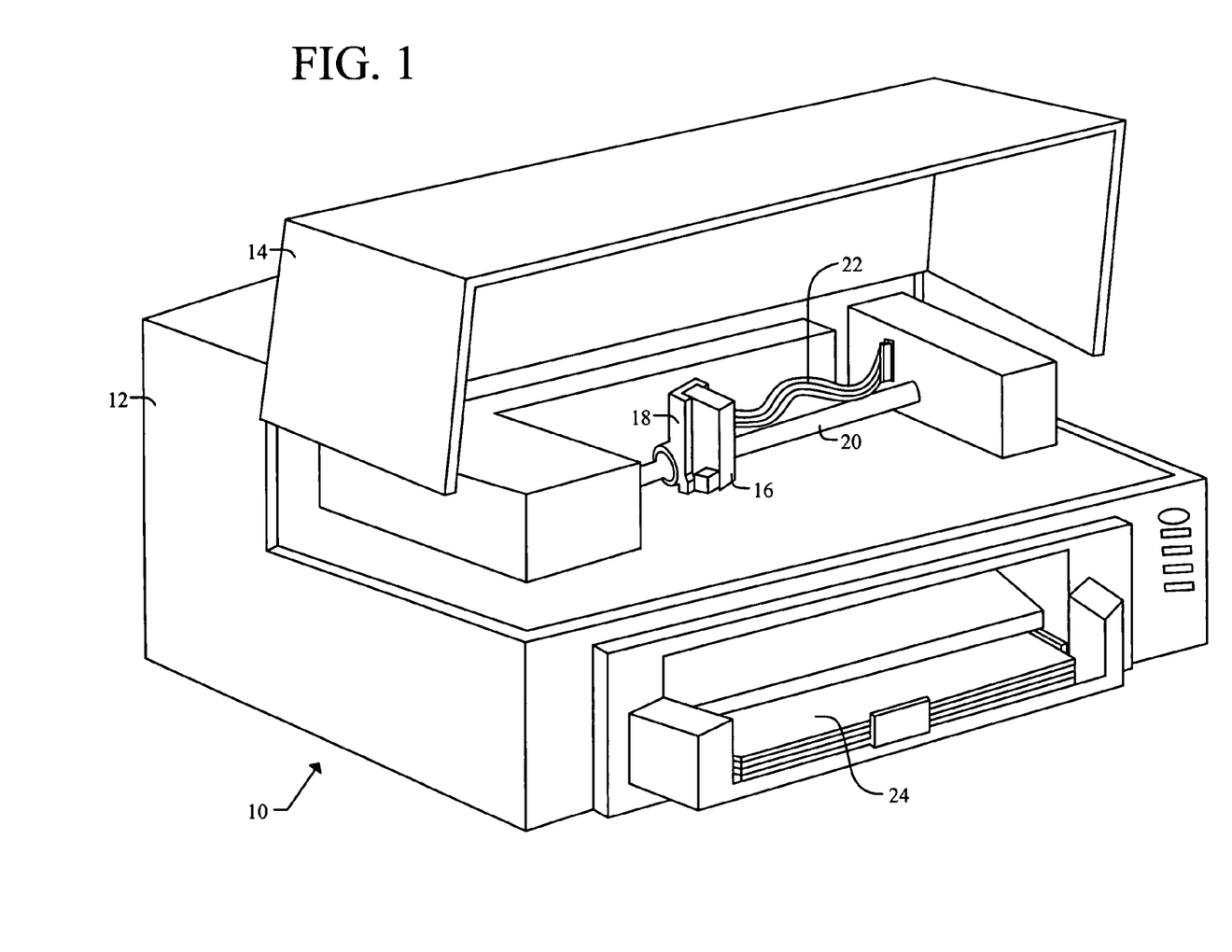
FIG. 1 is a perspective view of a printer that may be used in the implementation of the invention.

Referring to FIG. 1, an example of a printer 10 is shown. The printer includes a body 12 and a hinged cover 14. An inkjet printhead 16 is attached to a carriage 18 that moves bidirectionally along a carriage transport rail 20. A flexible cable 22 connects the components of the print carriage to a print engine, not shown. The flexible cable includes electrical power lines, clocking lines, control lines, and data lines. Nozzles of the inkjet printhead are individually activated to project droplets of ink onto a print medium delivered from a supply 24, such as a tray of paper. During each print operation, the print medium is stepped in one direction, while the inkjet printhead is moved along the transport rail in the perpendicular direction.

In the design of a printing system, a number of factors are considered to be significant. These factors include cost, speed, and print quality. A concern is that there is a tradeoff among these factors, particularly when a printer is designed to provide photo-quality printing. The inks of an inkjet printer 10 are water-based and are delivered to the medium as droplets. The quality of an image is dependent upon the consistency of droplet development at the printhead, the accuracy of delivery, and the droplet cooperation at the print medium.

Inkjet printing may be considered to be a droplet-on-demand (DOD) technology. Techniques for forming the droplets include thermal activation and piezoelectric pumping. Regardless, sufficient time between two activations of a single nozzle must be provided, if a sufficient volume of ink is to be accumulated for consistency in firing. Thus, a maximum "firing frequency" is enforced. For any particular nozzle of an inkjet printhead, this firing frequency limits the firing opportunities of the nozzle for a given period of time. Merely for the purpose of example, the firing frequency may be set at 12,400 activations per second.

At the print medium, there are concerns with "bleeding" and other phenomena. Bleeding of one color into another color is most detectable along edges of sharp color contrast within an image. Printers use a multi-pass concept to reduce the likelihood of bleeding and to provide compensation for other phenomena that affect image quality. Using the multi-pass concept, less than all of the droplets are deposited on a single pass over a particular area of the print medium. Each area of the print medium is scanned multiple times in order to deposit all of the droplets. The portion of the droplets which are deposited on a particular pass is controlled by a predefined masking pattern. As defined herein, a "masking pattern" is associated with a single pass, although multiple passes may be necessary in order to complete the printing. This use of the term is consistent with U.S. Pat. No. 6,310,640 to Askeland. In a multi-pass process, there is a "composite masking pattern" to which the print data is applied in defining droplet deposition. The composite masking pattern provides the basis for the individual masking patterns. Typically, the composite masking pattern is determined at the design stage for a particular printer. In printing two photographs, the composite masking pattern is applied in the same manner to the image data of the two photographs, so that it is the difference in the image data (from photograph to photograph) that causes differences between the two series of masking patterns.

The determination of which droplets are to be deposited on a particular pass includes a degree of randomness. In general, artifacts are more apparent when masks are more regular and uniform. While the generation of printing masks involves significant randomization, it is known to apply restrictions to such pattern generation. U.S. Pat. No. 6,250,739 to Serra describes some possible restrictions. A checkerboard pattern may be imposed on each masking pattern. Each image region is divided into distinct complementary patches. Bleeding among droplets placed in adjacent pixels of a composite image is less likely to occur, since horizontally neighboring pixels do not receive droplets in the same pass. However, bleeding may occur between diagonal pixels. Serra states that this can be overcome using the "Hickman system" in which printing in intervening lines and in intervening columns is presented in a single pass. The patent states that a concern with this system is that it forfeits the ability to print in the intervening lines and columns even with respect to print-modes in which bleeding and similar problems are absent, such as in a single-pass mode for printing black-and-white text. Serra describes bidirectional scanning printheads which discharge color-ink droplets at ultra high resolution, with each swath of printing on the paper being completed in either eight passes with four paper advances, or four passes with two paper advances, or two passes in a single paper advance.

SUMMARY OF THE INVENTION

In accordance with the invention, the speed at which a printhead is scanned across a medium, such as a sheet of paper, has a direct relationship with the selection or deselection of a mode of operation in which each nozzle of the printhead is restricted from being activated for successive firing opportunities of that nozzle. The "firing opportunities" are defined by the maximum firing frequency assigned to the nozzles of the printhead moving at a particular scanning velocity. With respect to the sheet of paper, these firing opportunities may be referred to as pixel locations on the sheet. The speed at which the printhead is moved over the medium is significantly increased when the restriction against activation of a nozzle in successive firing opportunities is imposed.

A printmask controller is configured to generate masking patterns which establish sequencing of activations of the nozzles during passes. The printmask controller is further configured to impose the limitation on the firing frequency of activations for each nozzle and to impose the restriction as to the activation for successive firing opportunities, if a speed-enhancement mode is selected. The printmask controller includes a standard mode of operation in which masking patterns may include activations of the individual nozzles in successive firing opportunities, but with a reduction in the speed of the printhead across the medium.

The selection between the standard mode of operation and the speed-enhancement mode of operation may be manual. For example, a user may be presented the option of selecting between a "Best Photo" option or a "Fast Best Photo" each time that a photograph is to be printed. The printing system may include a graphical user interface (GUI) program that enables the user selection. If "Best Photo" is selected, masking hardware employs a higher quality composite masking mask and the printhead is moved at the speed required to ensure that the optimal nozzle firing frequency is not violated. On the other hand, if the "Fast Best Photo" option is selected, the masking hardware uses the restricted-location composite masking mask and the printhead is moved at the higher speed.

As another possibility, the selection may be transparent to the user. While the processing requirements would be significant, the selected mode of operation may be varied during execution of the single print task. For example, the printmask controller may include a comparator that is activated when the standard mode of operation is selected. The comparator may be computer programming which determines whether individual masking patterns (i.e., pass-by-pass masking patterns) are without nozzle activations in successive firing opportunities, despite the absence of the restriction. The multi-speed drive is placed in its accelerated state when the comparator identifies a masking pattern in which the condition is satisfied. Thus, the standard mode may include printhead passes at two different scan velocities when the printmask controller is in the standard mode.

In the use of the printing system, a method of forming an image on a sheet of paper or other medium includes enabling at least two modes of operation for printing the image. Specifically, the standard mode and the speed-enhancement mode are enabled for generating masking patterns as subsets of the print data. The standard mode allows utilization of the maximum firing frequency. On the other hand, the speed-enhancement mode may be utilized when the masking patterns are based on a set of constraints that include restricting the masking patterns from including use of an individual nozzle in consecutive firing opportunities permitted on the basis of the maximum firing frequency. The method further includes controlling the speed of printing the image on the basis of the current mode of operation, with a higher relative speed between the nozzles and the medium being used with the speed-enhancement mode. For applications in which the nozzles are components of an inkjet printhead, it is the scanning velocity of the printhead that is controlled.

The method may include enabling a user to select between the two modes at the initiation of a print task. Alternatively or additionally, the method may include providing a pattern-analysis of the masking patterns when the printing is in the standard mode. The analysis detects specific masking patterns that satisfy the constraint regarding consecutive firing opportunities. If the constraint is satisfied, the scanning velocity may be increased for that masking pattern. In such an application, the scanning velocity is determined on a scan-by-scan basis.

DETAILED DESCRIPTION

Figure 2:
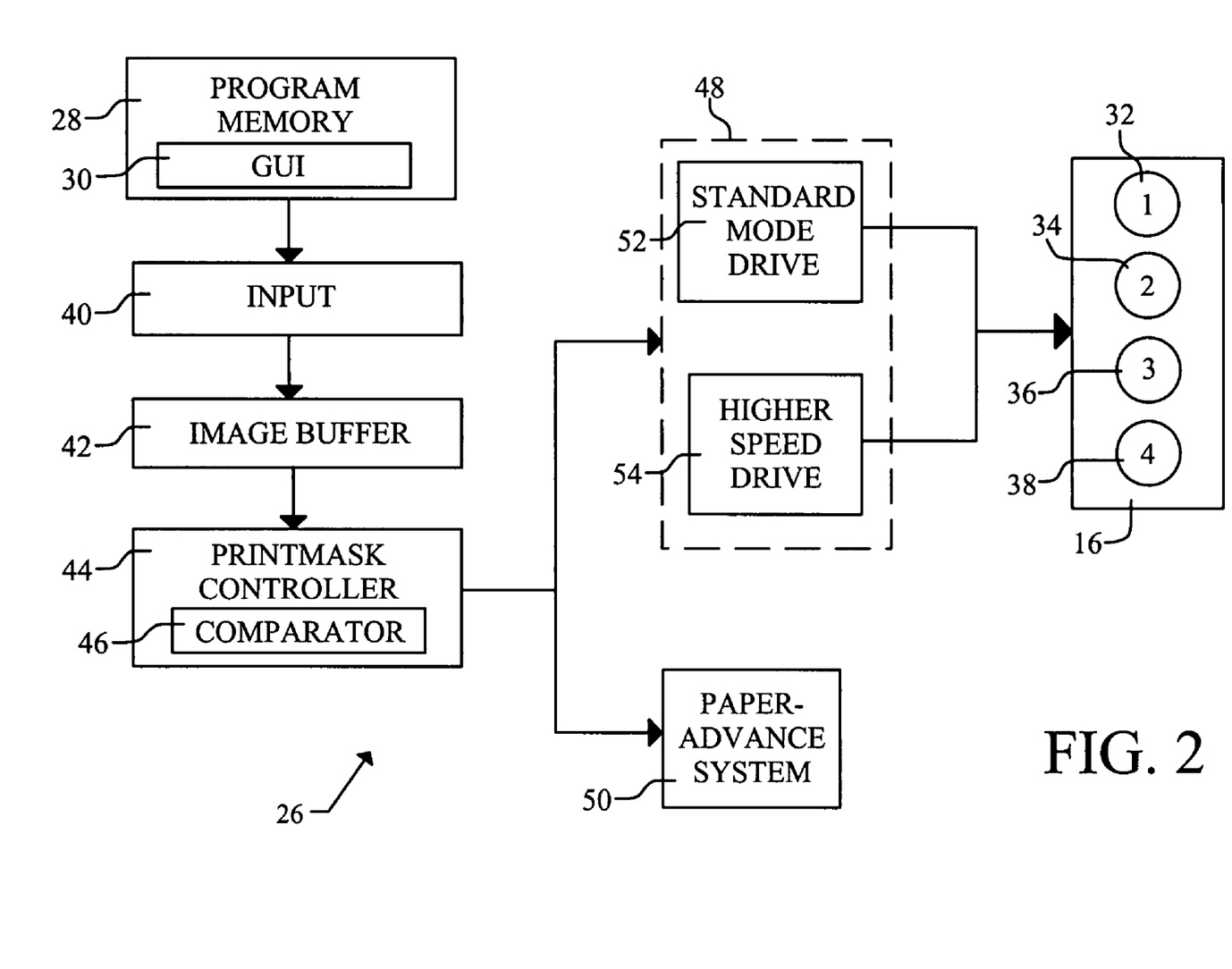
FIG. 2 is a block diagram of components for use in the printer of FIG. 1.

With reference to FIG. 2, a printing system 26 in accordance with one embodiment of the invention is shown as including components that may be self-contained within the printer 10 of FIG. 1 or may be distributed between two or more components. For example, the program memory 28 having a graphical user interface (GUI) 30 may be an element of a computer that is supported by the printer 10. The program memory may contain printer drive software.

The printing system is shown as having a printhead 16 that includes only four nozzles 32, 34, 36 and 38. As is well known in the art, printheads typically include a much greater number of nozzles. For example, an inkjet printhead may include 100 nozzles having a pitch of approximately 0.085 millimeters. The nozzles are arranged in a column that is perpendicular to the scanning direction of the printhead. In addition to having a greater number of nozzles within the column, many printheads include multiple columns. For example, a printhead that is used for forming color images will often include a number of parallel columns. As another possible modification to the embodiment of FIG. 2, there may be multiple printheads, such as a system that includes a color cartridge and an adjacent cartridge which is used to deposit only black ink. While the invention will be described primarily with reference to inkjet printheads, the invention may be applied to other technologies in which ink or other print materials are deposited from nozzles.

If the program memory 28 and the GUI 30 are components of a personal computer, the printing system 26 includes an input 40. In response to a print command, an image to be printed is transferred to an image buffer 42 via the input. The image buffer may be internal memory of the printer 10 shown in FIG. 1. The input 40 may include a cable port or may be a wireless transceiver.

Connected to the image buffer 42 is a printmask controller 44. The printmask controller is configured to generate masking patterns which establish sequencing for activations of the nozzles 32, 34, 36 and 38 during passes of the printhead 16 over a sheet of paper or other print medium. In accordance with the invention, the printmask controller has at least two modes of operation and a user selects a preferred mode for a particular print task. Automated mode selection is also a desired feature of the invention. When the controller is in a standard mode, the composite masking pattern is defined on the basis of a first set of constraints. Among the constraints is a limitation regarding the maximum firing frequency of each nozzle 32, 34, 36 and 38. The maximum firing frequency is selected for the purpose of ensuring that each nozzle is allotted time to be sufficiently replenished with ink following an activation. The purpose of the comparator 46 of the printmask controller will be described below, when referring to FIG. 5.

The printmask controller 44 is shown as providing inputs to a multi-speed drive 48 and a paper-advance system 50. With reference to FIG. 1, the paper-advance system may be any known approach to progressing paper from the paper supply 24 past the printhead 16. The paper advances in a direction perpendicular to the scanning direction of the printhead, as is well known in the art. The multi-speed drive 48 provides movement of the printhead in the scanning direction. In FIG. 2, there is a standard mode drive 52 and a higher speed drive 54.

As is well known in the art, an individual masking pattern from the printmask controller 44 defines the partial image to be formed for a particular pass of the printhead 16 over the sheet of paper. A masking pattern may be considered to be a grid of pixels representing locations on the sheet of paper. For example, each pixel location in the grid may be represented by a data "0" or a data "1." Pixel locations having a "1" will trigger activation of the nozzle at the corresponding location of the sheet of paper. On the other hand, a "0" will result in the corresponding location on the sheet of paper 66 being passed without deposition of a droplet.

Figure 3:
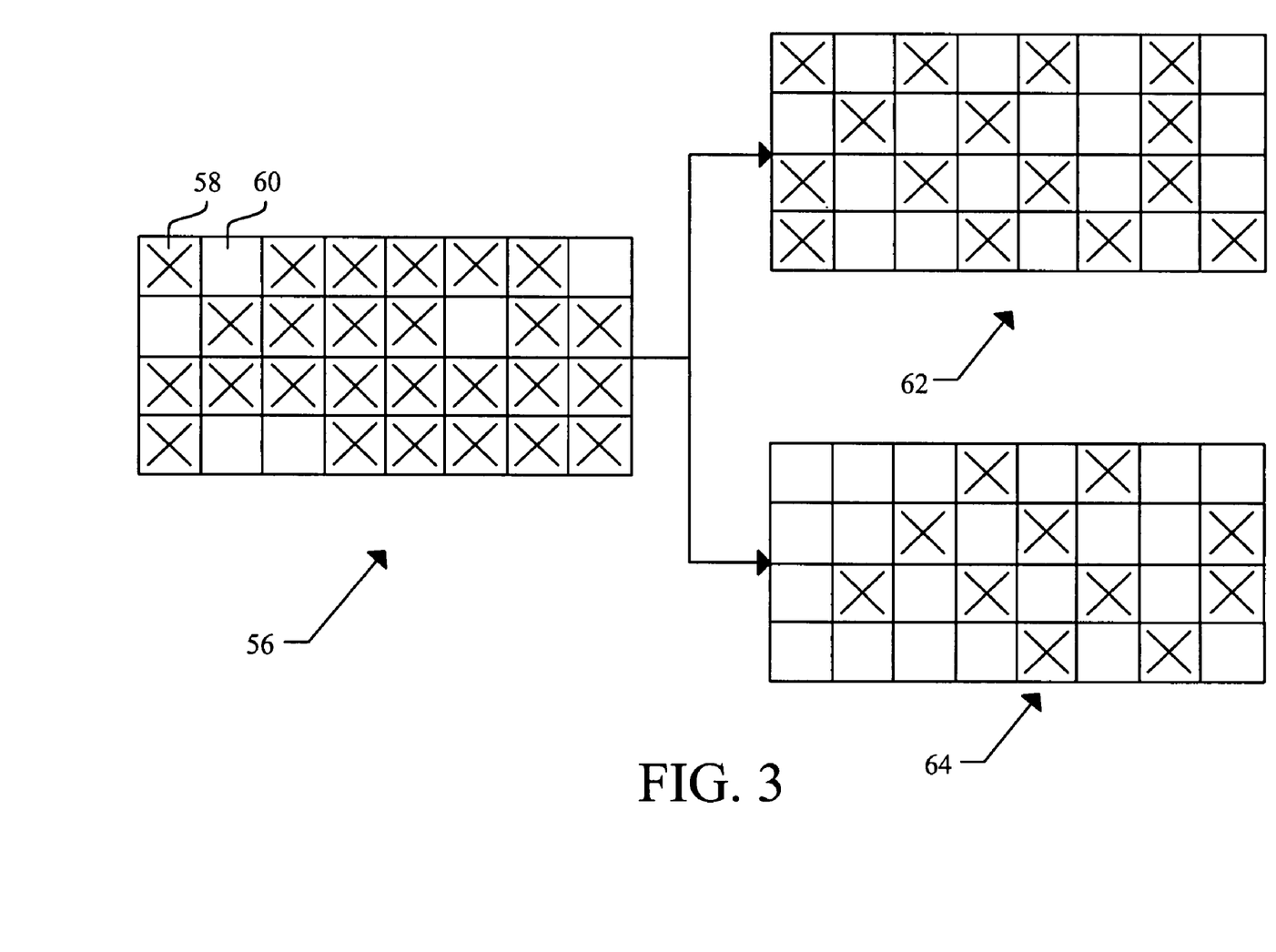
FIG. 3 is an example of a composite masking pattern and a pair of individual masking patterns resulting therefrom.

Referring now to FIG. 3, a composite masking pattern 56 includes the letter "X" for each location on a sheet of paper that is to receive a droplet. For example, pixel location 58 will receive a droplet, while pixel location 60 will not. However, not all of the pixel locations will receive a droplet in a single pass of a printhead. Rather, the composite masking pattern is divided into two masking patterns 62 and 64 for use in separate passes of the printhead across the sheet of paper 66. These two masking patterns 62 and 64 satisfy the condition that adjacent pixel locations in the scanning direction will not receive a droplet in the same pass. This is a condition established for the speed-enhancement mode of operation for the printmask controller 44 of FIG. 2. With the condition being satisfied for the two masking patterns, the speed at which the printhead is moved over the sheet of paper 66 can be significantly increased. Theoretically, the scanning speed can be doubled while maintaining the same firing frequency. However, there may be considerations which reduce this theoretical speed increase. For example, if the accuracy of droplet placement is reduced to an unacceptable level when the scanning speed is doubled, a smaller increase may be provided. On the other hand, if the speed can be doubled without imposing adverse effects, the theoretical relationship between increasing scanning speed and deposition intermittency can be extended. For example, if the imposed condition is that there be two deposition-free pixel locations between every droplet deposition of a masking pattern, it is theoretically possible to triple the scanning speed relative to the scanning speed at the "standard mode" of operation.

Figure 4:
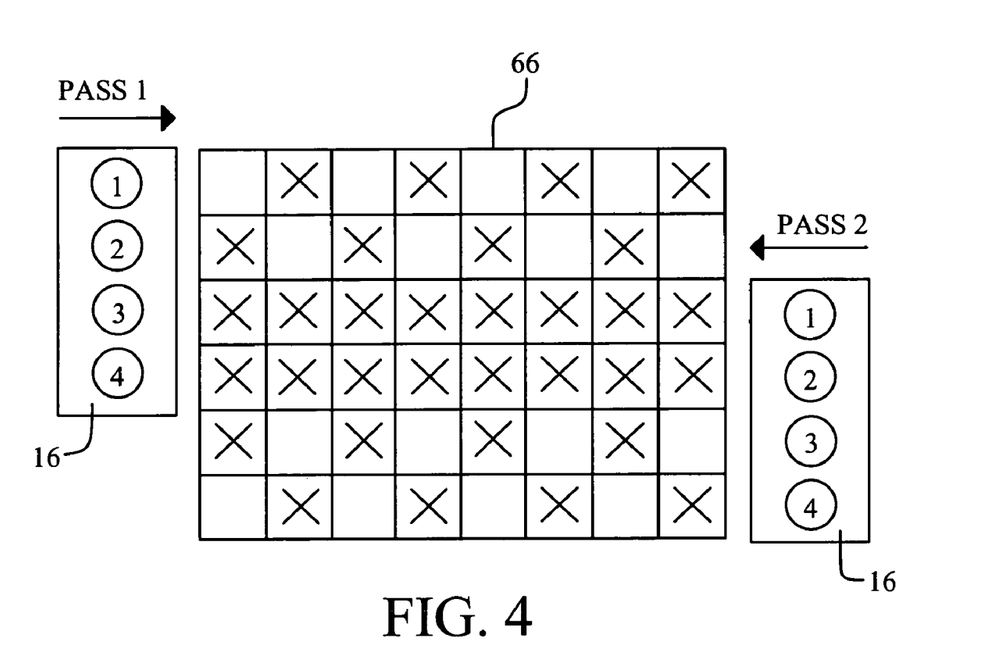
FIG. 4 is a conceptual view of the use of masking patterns to form an image.

FIG. 4 is a conceptual view of a two-pass print operation in which after the first two rows of pixel locations, each location is to receive a droplet. However, the printhead 16 may be operated at a scan velocity that is significantly higher than the scan velocity of the "standard mode," since the individual masking patterns for each pass do not include depositing droplets in adjacent pixel locations. In "Pass 1," droplets are not deposited in either the horizontally adjacent or the vertically adjacent pixel locations. Then, in "Pass 2," the printhead 16 has been stepped downwardly the equivalent of two rows of pixels and the full coverage of the third and fourth rows is completed. While not shown in FIG. 4, a third pass will completely fill in the pixel locations of the fifth and sixth rows.

Figure 5:
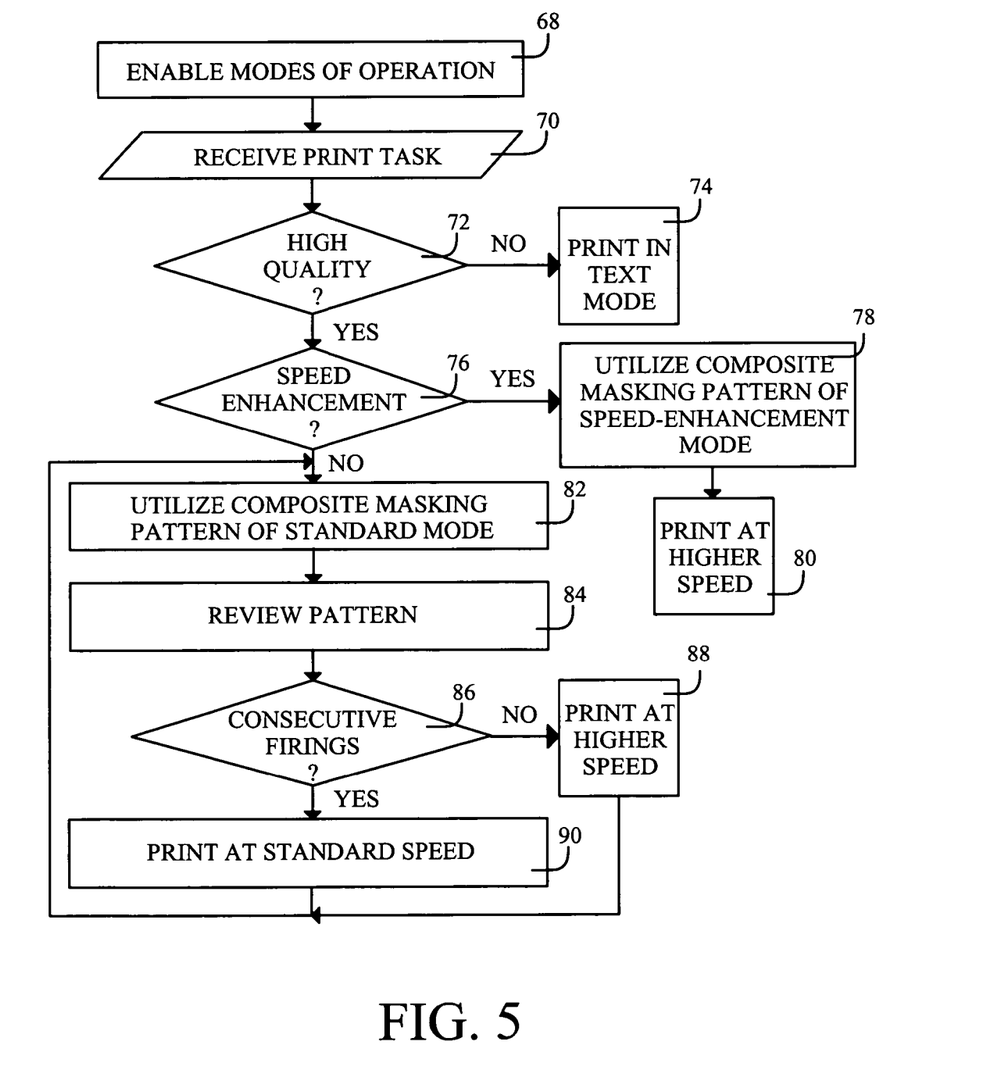
FIG. 5 is an example of a process flow of steps for implementing the invention.

A process flow of steps for implementing the invention is shown in FIG. 5. At step 68, at least two modes of printer operation are enabled. In a standard mode, masking patterns are generated under a first set of constraints and the printhead is driven at a standard speed. In a speed-enhancement mode, masking patterns are generated based upon a second set of constraints, which include disablement of nozzle firings for consecutive pixel locations in the scanning direction of the masking patterns. Optionally, there may be a third mode of printer operation, such as a text mode in which quality considerations are less significant to a particular print task. For text-only print tasks, a one-pass process may be sufficient.

At step 70, a particular print task is received. For example, a user of a personal computer may request printing of a document. The decision step 72 identifies the requested print quality. Many conventional printer drivers allow a user to select "draft" quality, photo quality, or a level of quality between these two. The user's selection may be used at decision step 72. When a draft quality or text-only printing is detected, printing may be executed in a text mode at step 74.

If an affirmative response is received at decision step 72, the process advances to decision step 76, wherein it is determined whether the print task is to be processed using the standard mode of printer operation or the speed-enhancement mode of printer operation. The decision step 76 may be executed manually. For example, the printing of a photograph-quality image may enable the user to select either a "Best Photo" or "Fast Best Photo" mode via the GUI. If "Best Photo" is selected, the process may follow the conventional approach of utilizing a composite masking pattern associated with the standard mode (step 82) and progressing the printhead at the same velocity for each scan across the print medium. A more complex approach in which the print speed is varied when the standard mode is selected will be described below when referring to steps 84, 86, 88 and 90. The more complex approach will have advantages in some applications.

If the "Fast Best Photo" (i.e., speed-enhancement) mode is selected at step 76, the process advances to step 78. At this step, a different composite masking pattern is used, so that the individual masking patterns are in effect generated according to the second set of constraints, which include disabling nozzle firings within consecutive pixel locations. Masking patterns 62 and 64 of FIG. 3 satisfy this constraint. The document or documents may then be printed at the higher speed, as indicated at step 80.

Optionally, the masking patterns that are provided at step 82 (following a negative response at step 76) progress immediately to the processing necessary for directing the masking patterns to the printhead. As a more process-intensive option, the comparator 46 of FIG. 2 is used to analyze each single-pass masking pattern to determine whether the pattern is one in which there are no nozzle firings in consecutive pixel locations. This may occur for some single-pass patterns despite the absence of a constraint that ensures such occurrence. Thus, the masking patterns are reviewed on a pattern-by-pattern basis at step 84 to identify such occurrences.

The review of masking patterns at step 84 is followed by the decision step 86. If it is determined that a particular masking pattern does not require nozzle firings for consecutive pixel locations, the masking pattern is operatively associated with printing at the higher scanning velocity associated with the speed-enhancement mode, as indicated at step 88. On the other hand, a masking pattern that includes the requirement of a nozzle firing for consecutive pixel locations will be printed at the standard scanning velocity for the printhead, as indicated as step 90. For either step 88 or 90, the process will loop back to step 84 until the final masking pattern of the print task has been forwarded to the printhead.

What is claimed is:

1. A printing system for printing an image on a medium comprising:

a printhead mounted for movement relative to the medium on which print material is to be deposited, said printhead including a plurality of nozzles from which said print material is fired;

a multi-speed drive connected to scan said printhead across said medium in a series of passes, said multi-speed drive being configured for selective operations at a first scan velocity and a second scan velocity that is greater than said first scan velocity; and a printmask controller configured to provide a composite pixel masking pattern and individual pixel masking patterns which are based on the composite pixel masking pattern, where the individual pixel masking patterns establish sequencing of activations of said nozzles during said passes and impose a limitation on a firing frequency of activations for each said nozzle, wherein said printmask controller is further configured to provide at least two modes of operation, including a standard mode in which the plurality of nozzles are fired based on the composite pixel masking pattern during a given scan of the printhead as the multi-speed drive is driven at the first scan velocity, and a speed-enhancement mode in which the individual pixel masking patterns restrict firing of the nozzles on the medium to prevent the firing of the nozzles in adjacent pixels of the composite pixel masking pattern in a direction of a given scan as the multi-speed drive is driven at the second scan velocity, successive passes of the nozzles over the medium in the speed-enhancement mode depositing print material for all pixels of the image within the composite pixel masking pattern.

2. The printing system of claim 1 further comprising a graphical user interface (GUI) programmed to present a user with a selection to set said printmask controller in said standard mode or said speed-enhancement mode.

3. The printing system of claim 1 wherein said printmask controller includes a comparator which determines whether pixel masking patterns defined while said printmask controller is in said standard mode are pixel masking patterns without any activations of individual nozzles in said successive firing opportunities, said multi-speed drive being responsive to detection of such pixel masking patterns to operate at said second scan velocity during printhead passes in which such pixel masking patterns are implemented.

4. The printing system of claim 3 wherein said multi-speed drive is responsive to computer programming to switch between operations at said first and second scan velocities when said printmask controller is in said standard mode, said switching being based on detections of said pixel masking patterns without any activations of individual nozzles in said successive firing opportunities.

5. The printing system of claim 1 wherein said printhead is an inkjet cartridge having at least one column of nozzles.

6. The printing system of claim 1 wherein said printmask controller provides said pixel masking patterns as subsets of firings of the composite pixel masking pattern, each said subset being specific to a particular scan of said printhead in forming said image.

7. The printing system of claim 6 wherein said printmask controller and said multi-speed drive are cooperative to form said image in overlapping scans of said printhead relative to said medium.

8. A method of forming an image on a medium comprising:
enabling at least two modes of operation in printing said image, including a standard mode and a speed-enhancement mode, each said mode being associated with a specific set of constraints in providing pixel masking patterns that are representative of grids of pixel locations containing subsets of information for printing said image using nozzles that are individually restricted to a maximum firing frequency, said maximum firing frequency being a basis for determining said pixel locations in a scanning direction;
when in said standard mode, providing said pixel masking patterns based on a first set of said constraints to allow nozzle firings for consecutive pixel locations in said scanning direction;
when in said speed-enhancement mode, providing said pixel masking patterns based on a second set of said constraints, including imposing a further constraint on using said nozzles, said further constraint being one which restricts said pixel masking patterns from including nozzle firings for said consecutive pixel locations in said scanning direction;
controlling said nozzles on a basis of said pixel masking patterns, wherein successive passes of the nozzles over the medium in the speed-enhancement mode deposits print material for all pixels of the image within the composite masking pattern; and
controlling speed of said nozzles in said scanning direction during printing of said image on a basis of a current mode of operation including providing a higher speed when in said speed-enhancement mode as compared to when in said standard mode.

9. The method of claim 8 wherein controlling said nozzles includes controlling activations of inkjet nozzles and wherein controlling said speed of said nozzles includes determining a scanning velocity of an inkjet printhead relative to said medium.

10. The method of claim 8 further comprising enabling a user to select said mode of operation in printing said image.

11. The method of claim 8 further comprising providing a pattern-by-pattern analysis of said pixel masking patterns when in said standard mode in order to detect pixel masking patterns that satisfy said further constraint of said speed enhancement mode.

12. The method of claim 11 wherein controlling said speed of said nozzles includes increasing said speed of said nozzles upon detection of each pixel masking pattern in which said further constraint is satisfied.

13. A printing system comprising:
an inkjet printhead having at least one column of inkjet nozzles in a columnar direction;
a transport connected to bidirectionally move said inkjet printhead generally perpendicular to said columnar direction, said transport including a multi-speed drive;
a printmask generator for generating a composite pixel masking pattern and one or more pixel masking subsets of the composite pixel masking pattern, the printmask generator adapted to generate the composite pixel masking pattern and one or more pixel masking subsets of the composite pixel masking pattern based on whether the printing system is in a standard mode or a speed-enhancement mode; and
a controller that is responsive to selection of the standard or speed-enhancement modes of operation for controlling said transport and said printmask generator,
said standard mode allowing firing of said inkjet nozzles in consecutive pixel locations of the composite pixel masking pattern in a scanning direction of the inkjet printhead, said speed-enhanced printing mode enabling a faster transport speed as compared to said speed-enhanced printing mode by using said one or more pixel masking subsets of the composite pixel masking pattern to disable said firing of said inkjet nozzles in said consecutive pixel locations, wherein print material is deposited for all pixels of the image within the composite pixel masking pattern in the speed-enhancement mode.

14. The printing system of claim 13 further comprising a graphical user interface for enabling a user to select said standard and speed-enhancement modes.

15. The printing system of claim 13 wherein said transport includes a carriage on which said inkjet printhead is mounted, said carriage being supported on a carriage transport rail for movement along said carriage transport rail.

16. The printing system of claim 13 wherein said controller includes programming that enforces a maximum firing frequency of each said inkjet nozzle based on whether the printing system is in said normal mode or said speed-enhancement mode.

17. A printing system comprising:

a printhead mounted for movement relative to a medium, the printhead including a plurality of nozzles for dispensing print material;

a multi-speed drive operative to move the printhead across the medium, the multi-speed drive being operative to cause the printhead to move at a first velocity and a second velocity that is greater than the first velocity; and a printmask controller operative to provide a composite pixel masking pattern that is used in a standard printing mode to control an activation of the plurality of nozzles, and one or more individual pixel masking patterns which are based on the composite pixel masking pattern, the printmask controller using the composite pixel masking pattern to dispense print material from the plurality of nozzles while in a standard mode in which the printhead is moved at said first velocity, the printmask controller using said one or more individual pixel masking patterns to dispense print material from the plurality of nozzles while in speed-enhancement mode in which the printhead is moved at said second velocity, wherein the printmask controller activates an individual nozzle in only one of two successive firing opportunities using the one or more individual pixel masking patterns when the printhead is moved at the second velocity, and wherein print material for all pixels of the image within the composite pixel masking pattern is deposited on the medium in the speed-enhancement mode.

18. The printing system of claim 17, wherein the plurality of nozzles are activated in the successive firing opportunities when the printhead is moved at the first velocity.

19. The printing system of claim 17, further comprising a graphical user interface (GUI) operative to allow a user to select the standard mode or the speed-enhancement mode.

20. The printing system of claim 17, wherein the printmask controller includes a comparator that is operative to determine, based on the pixel masking patterns, whether the printmask controller is to be operated in the standard mode or in the speed-enhancement mode.

21. The printing system of claim 17, wherein the printmask controller is operative to determine which mode the printmask controller is to be operated in based on information that is used to control the firing of the plurality of nozzles.

22. The printing system of claim 17, wherein the printmask controller is operative to switch between the standard mode and the speed-enhancement mode in response to computer readable program code.

23. The printing system of claim 17, wherein the printmask controller is operative to switch between the standard mode and the speed-enhancement mode in response to a pixel masking pattern that does not provide for the activation of any individual nozzle in the successive firing opportunities.

24. The printing system of claim 17, wherein the printhead comprises an inkjet cartridge having at least one column of nozzles.

25. The printing system of claim 17, wherein the printmask controller and the multi-speed drive are operative to perform overlapping scans of the printhead relative to the medium.

26. A printing system comprising:

a print means positioned for movement relative to a medium, the print means including a plurality of nozzles for dispensing print material;

a multi-speed drive means operative to move the print means across the medium; the multi-speed drive means being operative to cause the print means to move at a first velocity in a normal mode and a second velocity in a speed-enhancement mode, wherein the second velocity is greater than the first velocity; and a print controller means operative to provide a composite pixel masking pattern and one or more individual pixel masking patterns which are based on the composite pixel masking pattern, wherein the printmask controller means is adapted to provide at least two modes of operation, including a standard mode in which the plurality of nozzles are fired based on the composite pixel masking pattern during a given scan of the print means as the multi-speed drive means is driven at the first velocity, and a speed-enhancement mode in which said one or more individual pixel masking patterns are used to restrict firing of nozzles on the medium to prevent the firing of nozzles in adjacent pixels of the composite pixel masking pattern in the direction of a given scan as the multi-speed drive is driven at the second scan velocity, successive passes of said nozzles over the medium in the speed-enhancement mode depositing print material for all pixels of the image within the composite pixel masking pattern.

27. The printing system of claim 26, wherein the plurality of nozzles are activated in the successive firing opportunities when the print means is moved at the first velocity.

28. The printing system of claim 26, further comprising a graphical user interface means operative to allow a user to select the standard mode or the speed-enhancement mode.

29. The printing system of claim 26, wherein the print controller means includes a comparator that is operative to determine, based on the pixel masking pattern, whether the print controller means is to be operated in the standard mode or in the speed-enhancement mode.

30. The printing system of claim 26, wherein the print controller means is operative to determine which mode the print controller means is to be operated in based on information that is used to control the firing of the nozzles.

31. The printing system of claim 26, wherein the print controller means is operative to switch between the standard mode and the speed-enhancement mode in response to computer readable program code.

32. The printing system of claim 26, wherein the print controller means is operative to switch between the standard mode and the speed-enhancement mode in response to a pixel masking pattern that does not provide for the activation of any individual nozzle in the successive firing opportunities.

33. The printing system of claim 26, wherein the print means comprises an inkjet cartridge having at least one column of nozzles.

34. The printing system of claim 26, wherein the print controller means is operative to provide the pixel masking pattern as a plurality of subsets of firings of the plurality of nozzles.

35. The printing system of claim 26, wherein the print controller means and the multi-speed drive means are operative to perform overlapping scans of the print means relative to the medium.

* * * * *